US012521176B2

(12) United States Patent
Zhang et al.

(10) Patent No.: US 12,521,176 B2
(45) Date of Patent: Jan. 13, 2026

(54) FLEXIBLE SUCTION COAGULATOR

(71) Applicant: University of Kentucky Research Foundation, Lexington, KY (US)

(72) Inventors: Guigen Zhang, Lexington, KY (US); Moamen M. Gabr, Lexington, KY (US); Mark A. Fritz, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 289 days.

(21) Appl. No.: 17/200,210

(22) Filed: Mar. 12, 2021

(65) Prior Publication Data

US 2021/0282849 A1   Sep. 16, 2021

Related U.S. Application Data

(60) Provisional application No. 62/988,551, filed on Mar. 12, 2020.

(51) Int. Cl.
| *A61B 18/16* | (2006.01) |
| *A61B 18/00* | (2006.01) |
| *A61B 18/12* | (2006.01) |
| *A61B 18/14* | (2006.01) |

(52) U.S. Cl.
CPC .......... *A61B 18/16* (2013.01); *A61B 18/1233* (2013.01); *A61B 2018/00178* (2013.01); *A61B 2018/00595* (2013.01); *A61B 2018/00601* (2013.01); *A61B 2018/00607* (2013.01); *A61B 2018/00702* (2013.01); *A61B 2018/00982* (2013.01); *A61B 2018/1253* (2013.01); *A61B 2018/126* (2013.01); *A61B 2018/1435* (2013.01); *A61B 2218/007* (2013.01)

(58) Field of Classification Search
CPC ................ A61B 18/16; A61B 18/1233; A61B 2018/00178; A61B 2018/00595; A61B 2018/00601; A61B 2018/00607; A61B 2018/00702; A61B 2018/00982; A61B 2018/1253; A61B 2018/126; A61B 2018/1453

See application file for complete search history.

(56) References Cited

U.S. PATENT DOCUMENTS

| 3,828,780 | A | 8/1974 | Morrison, Jr. |
| 5,336,222 | A | 8/1994 | Durgin, Jr. et al. |
| 5,342,357 | A | 8/1994 | Nardella |
| 6,027,501 | A | 2/2000 | Goble et al. |
| 6,063,083 | A * | 5/2000 | Duong-Van ........ A61B 18/1402 607/101 |
| 6,325,800 | B1 | 12/2001 | Durgin et al. |
| 6,837,888 | B2 * | 1/2005 | Ciarrocca .......... A61B 18/1492 606/41 |
| 6,893,442 | B2 * | 5/2005 | Whayne ............. A61B 18/1492 606/49 |
| 7,063,698 | B2 | 6/2006 | Whayne et al. |

(Continued)

*Primary Examiner* — Joseph A Stoklosa
*Assistant Examiner* — Annie L Shoulders
(74) *Attorney, Agent, or Firm* — Stites & Harbison PLLC; Warren D. Schickli (57) ABSTRACT

A flexible suction coagulator is adapted for use with an endoscope. The flexible suction coagulator includes an elongated tubular body, a coagulator adjacent a distal end of that tubular body, at least one suction port and a connection terminal at a proximal end of the tubular body.

26 Claims, 9 Drawing Sheets

(56) References Cited

U.S. PATENT DOCUMENTS

| | | | |
|---|---|---|---|
| 7,235,072 B2* | 6/2007 | Sartor | A61B 18/1445 606/41 |
| 7,744,595 B2 | 6/2010 | Truckai et al. | |
| 8,317,786 B2* | 11/2012 | Dahla | A61B 18/1402 604/35 |
| 8,920,816 B2 | 12/2014 | Papay | |
| 9,474,571 B2 | 10/2016 | Rioux et al. | |
| 2002/0193781 A1 | 12/2002 | Loeb | |
| 2003/0225403 A1* | 12/2003 | Woloszko | A61B 18/148 606/41 |
| 2010/0048989 A1 | 2/2010 | Akahane | |
| 2013/0006234 A1 | 1/2013 | Couvillon, Jr. | |
| 2014/0142569 A1* | 5/2014 | Plascencia, Jr. | A61B 18/1492 606/41 |
| 2014/0296630 A1 | 10/2014 | Zwirkoski | |
| 2016/0346037 A1* | 12/2016 | Truckai | A61B 18/148 |
| 2017/0020599 A1* | 1/2017 | Brooke | A61B 18/1442 |
| 2019/0192180 A1 | 6/2019 | Germain et al. | |
| 2019/0365457 A1* | 12/2019 | Joseph | A61B 18/1206 |
| 2020/0305972 A1* | 10/2020 | Kadamus | A61B 18/1492 |
| 2021/0338326 A1* | 11/2021 | Hancock | A61B 18/1815 |

* cited by examiner

FLEXIBLE SUCTION COAGULATOR

RELATED APPLICATION

This application claims priority to U.S. Provisional Patent Application Ser. No. 62/988,551 filed on Mar. 12, 2020 which is hereby incorporated by reference in its entirety.

TECHNICAL FIELD

This document relates generally to the medical equipment field and, more particularly, to a flexible suction coagulator adapted for receipt in a working channel or lumen of an endoscope.

BACKGROUND

Disclosed herein is a flexible suction coagulator providing both suction and coagulator functions. The flexible suction coagulator has the capability to go through flexible endoscopes. It will be used for control of bleeding and for the cauterization of granulation tissue. It could also be used to debulk tumors.

The working channel of single channel gastrointestinal endoscopes must be used to both pass the instruments and for suction. In bleeding conditions, multiple devices can be used to control the bleeding but none of these devices allow for suction at the same time through them. Suction is important to clear the blood and fluid and allow for better visualization which is a key for procedure success. In addition, any blood or fluid around the cautery device will prohibit effective cauterization. Advantageously, the flexible suction coagulator disclosed herein has a cautery device or coagulator at the tip that may be operated in a unipolar or a bipolar excitation mode to control bleeding and it also has a hollow lumen that can be connected to a suction device to allow for suction.

With the expansion in interventional endoscopic procedures, we are seeing more iatrogenic (procedure related) GI bleeding. As a result there is an increased need for the flexible suction coagulator disclosed in this document. More specifically, the flexible suction coagulator fills a gap in the field of flexible endoscopy. Further, the flexible suction coagulator is also adapted for other applications and useful in other fields that utilize channeled scopes such as Otolaryngology, Colorectal, and Interventional Pulmonology. Outside of flexible endoscopy, there are robotic systems (such as the da Vinci Robot and the Medrobotics system) that could also benefit from a flexible endoscopic coagulator to control bleeding intraoperatively where direct line of sight is not achievable.

SUMMARY

In accordance with the purposes and benefits set forth herein, a novel flexible suction coagulator is provided. The flexible suction coagulator is adapted for use with an endoscope. The flexible suction coagulator comprises: (a) a flexible, elongated, tubular body adapted for receipt in the endoscope, (b) a coagulator and tissue cutter adjacent the distal end, (c) at least one suction port adjacent the distal end and (d) a connection terminal at the proximal end.

The flexible, elongated tubular body has a proximal end, a distal end and a lumen/suction channel extending from the proximal end to the distal end. The connection terminal includes (1) a suction port in communication with the suction channel and (2) an electrical connector electrically connected with the coagulator and tissue cutter.

In one or more of the many possible embodiments of the flexible suction coagulator, the flexible suction coagulator further includes a power source connected to the electrical connector. In one or more of the many possible embodiments of the flexible suction coagulator, the flexible suction coagulator includes an actuator for activating the power source and activating the coagulator and tissue cutter to coagulate, cut and cauterize tissue of a patient. That actuator may comprise a foot pedal actuator connected to the power source.

In one or more of the many possible embodiments of the flexible suction coagulator, the coagulator and tissue cutter comprises a pair of cooperating electrodes. In one or more of the many possible embodiments of the flexible suction coagulator, the coagulator and tissue cutter comprises two helical electrodes. In one or more of the many possible embodiments of the flexible suction coagulator, the coagulator and tissue cutter comprises two interdigitated electrodes.

In one or more of the many possible embodiments of the flexible suction coagulator, the at least one suction port comprises two opposed suction ports in a sidewall of the flexible elongated tubular body adjacent the distal end. Further, the flexible, elongated tubular body may include a tip opening at the distal end that is also in communication with the suction channel. The opposed suction ports may have a cross sectional area of between about 0.05 mm$^2$ and about 15 mm$^2$ and the tip opening may have a cross sectional area of between about 0.05 mm$^2$ and 15 mm$^2$. The ratio of the cross sectional area of the two opposed suction ports to the cross sectional area of the tip opening may be between 0.1:1 to 400:1.

In one or more of the many possible embodiments of the flexible suction coagulator, the flexible suction coagulator may include a fluid sensor. That fluid sensor may take the form of an impedance monitor. Further, the flexible suction coagulator may include a suction source connected to the suction port and a controller for the suction source. That controller may be adapted to activate the suction source to apply suction at the at least one suction port in response to the fluid sensor detecting saline solution, blood or other body fluids at the electrodes adjacent the distal end of the flexible, elongated tubular body.

In one or more of the many possible embodiments of the flexible suction coagulator, the flexible suction coagulator further includes a fluid delivery channel with a discharge opening at the tip of the elongated body. Such an embodiment of the flexible suction coagulator may further include a fluid source connected to the fluid delivery channel through a fluid port at the connection terminal.

In one or more of the many possible embodiments of the flexible suction coagulator, the controller is further configured to deliver the fluid through the discharge opening in pulses.

In one or more of the many possible embodiments of the flexible suction coagulator, the flexible suction coagulator includes a grounding pad that adheres to the patient. Further, the coagulator and tissue cutter comprises a first electrode and a second electrode. In addition, the controller is adapted to provide coagulation action in a bipolar excitation mode through the first and second electrodes or a unipolar excitation mode through one of the first and second electrodes and the grounding pad. In one or more of the many possible embodiments of the flexible suction coagulator, the controller may be adapted to provide tissue cutting action in a unipolar excitation mode through one of the first and second electrodes with the grounding pad completing the circuit. The controller may be adapted to use a first wave form of an alternating current signal for providing tissue cutting action and a second wave form of an alternating current signal for providing the coagulation or cautery action. The first wave form may be a sinusoidal continuous wave form and the second wave form may be a sinusoidal intermittent wave form.

In the following description, there are shown and described several preferred embodiments of the flexible suction coagulator. As it should be realized, the flexible suction coagulator is capable of other, different embodiments and its several details are capable of modification in various, obvious aspects all without departing from the flexible suction coagulator as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the flexible suction coagulator and together with the description serve to explain certain principles thereof.

Reference will now be made in detail to the present preferred embodiments of the method, examples of which are illustrated in the accompanying drawing figures.

DETAILED DESCRIPTION

Figure 1:
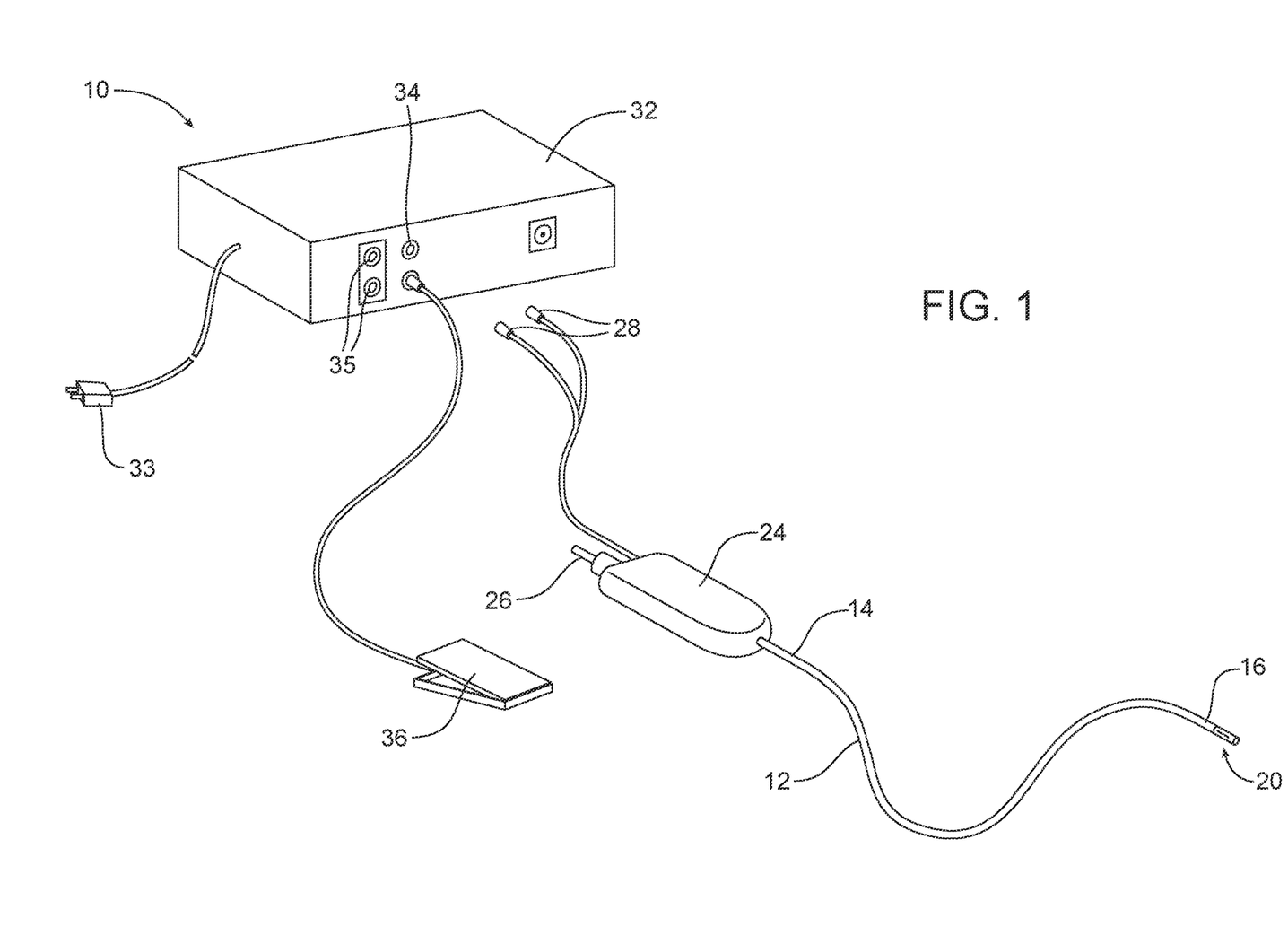
FIG. 1 is a perspective view of the new and improved flexible suction coagulator.
Figure 2:
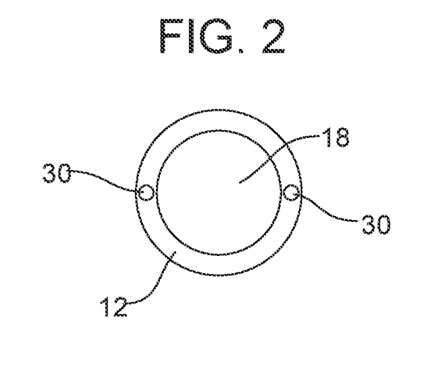
FIG. 2 is a distal end view of one possible embodiment of the flexible suction coagulator including a single passageway for application of suction.
Figure 3:
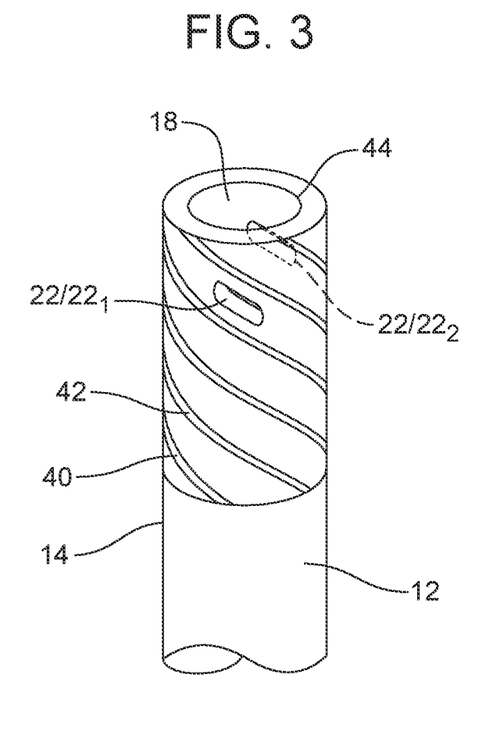
FIG. 3 is a detailed perspective illustration of one possible embodiment of the flexible suction coagulator of FIG. 2 wherein the coagulator comprises two helical electrodes.

Reference is now made to FIGS. 1-3 which illustrate the novel flexible suction coagulator 10. The flexible suction coagulator 10 includes an elongated, tubular body 12 that may be adapted for receipt in the working channel C of an endoscope E (see also FIGS. 9 and 10). The elongated body 12 includes a proximal end 14, a distal end 16 and a lumen or suction channel 18 extending from the proximal end to the distal end.

The elongated, tubular body 12 may be made from any appropriate material including, but not necessarily limited to medical grade polymers, plastics and composite materials such as polytetrafluoroethylene (PTFE), high density polyethylene (HDPE), nylon and the like. The elongated tubular body 12 may have a length of between about 3 cm to about 300 cm and an outer diameter of between about 0.5 mm to about 5 mm depending upon the ultimate medical application.

The flexible, suction coagulator 10 also includes a coagulator and tissue cutter, generally designated by reference numeral 20, at or adjacent the distal end 16 of the elongated tubular body 12. At least one suction port 22 is provided in the wall of the tubular body 12 adjacent the distal end. The suction port 22 is in communication with the suction channel 18. In addition, the flexible suction coagulator 10 includes a connection terminal 24 at the proximal end 14 of the elongated tubular body 12. The connection terminal includes (a) a suction connector 26, that is in communication with the lumen or suction channel 18 and (b) an electrical connector 28 electrically connected with the coagulator and tissue cutter 20 by electrical leads 30 that may be embedded in and running through the wall of the tubular body 12 to the coagulator. The connection terminal 24 may be made from any appropriate material of a type known in the art including those materials used to make the elongated tubular body 12.

The flexible suction coagulator 10 may further include an electric power source 32 capable of providing at least two different wave forms of an alternating current (AC) signal. Power range may be 10-20 W, 150-750V and 100-750 KH$_3$. Such a power source 32 or electrosurgical unit (ESU) is known in the art. One supplier for such a power source/ESU is ERBE Elektromedizin, GmbH headquartered in Tubingen, Germany. One of the electrical connectors 28 may be connected to the power source 32 at the connection point 34 for unipolar operation or both connectors may be connected to the connection points 35 for bipolar operation. The power source 32 may be connected to a standard wall electrical outlet (not shown) by means of the plug 33 or may be hard-wired into the electrical system of the hospital or clinic facility.

The flexible suction coagulator 10 may also include an actuator 36 for activating and controlling the power source 32. In the illustrated embodiment, the actuator 36 is a foot pedal actuator connected to the power source 32 at the electrical connector/plug-in 38.

In the embodiment of the flexible suction coagulator 10 illustrated in FIGS. 1-3, the coagulator and tissue cutter 20 comprises two helical electrodes (note the first electrode 40 and the second electrode 42 that are connected to the power source 32 through the electrical connector 28 and the leads 30) extending around the distal end 16 of the elongated body 12 adjacent the tip opening 44. In this embodiment, the suction port 22 comprises first and second opposed ports $22_1$ and $22_2$ in the sidewall of the elongated body. The opposed ports $22_1$, $22_2$ may have a combined cross sectional area of between about 0.05 mm$^2$ and about 15 mm$^2$ and the tip opening 44, also in communication with the suction channel 18, may have a cross sectional area of between about 0.05 mm$^2$ and 15 mm$^2$. The ratio of the combined cross sectional area of the two opposed suction ports $22_1$, $22_2$ to the cross sectional area of the tip opening 44 is between about 0.1:1 to 400:1. The ports $22_1$, $22_2$ augment suction in the event the tip opening 44 is partially or fully blocked by pressing against tissue or as a result of other circumstance.

Figure 4:
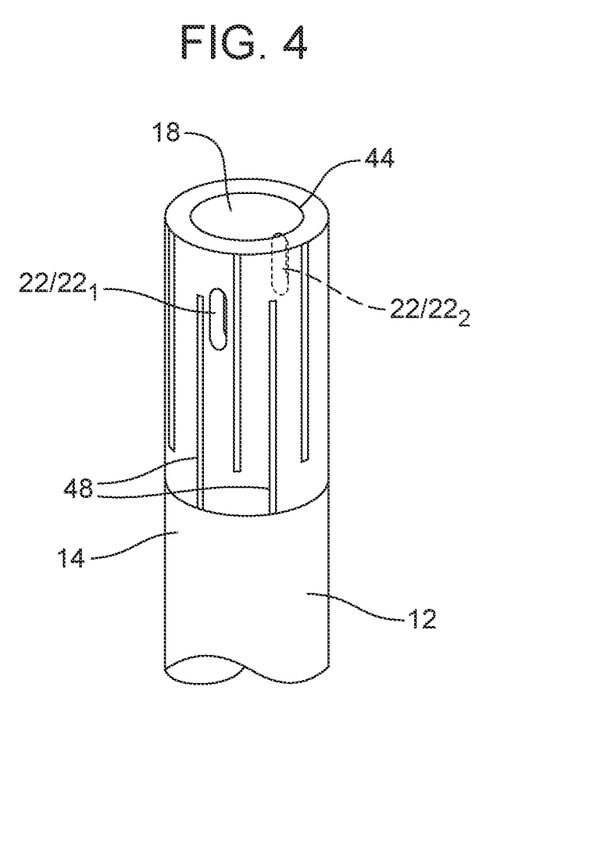
FIG. 4 is a detailed perspective illustration of another possible embodiment of the flexible suction coagulator of FIG. 2 wherein the coagulator comprises two interdigitating electrodes.

In an alternative embodiment of the flexible suction coagulator 10 illustrated in FIG. 4, the coagulator and tissue cutter 20 comprises two interdigitating electrodes (note the first electrode 46 and the second electrode 48). This embodiment also includes the opposed suction ports $22_1$ and $22_2$ as well as the tip opening 44.

Figure 5:
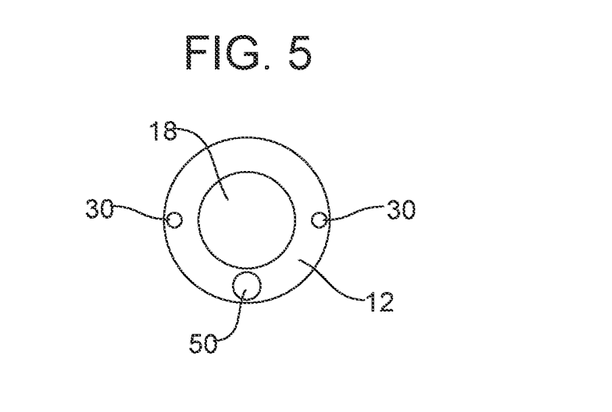
FIG. 5 is a cross sectional view of an alternative embodiment of the flexible suction coagulator including two passageways, one for the application of suction and one for fluid delivery.

In yet another alternative embodiment of the flexible suction coagulator 10 illustrated in FIG. 5, the flexible suction coagulator further includes a fluid delivery channel 50 adapted for delivering saline or other appropriate fluid for flushing cauterized tissue, blood or other debris from the treatment site into the suction port 22. As best illustrated in FIG. 8, a fluid source 52, including a fluid pump, may be connected to the fluid delivery channel 50 through a fluid port 54 at the connection terminal 24.

Figure 6:
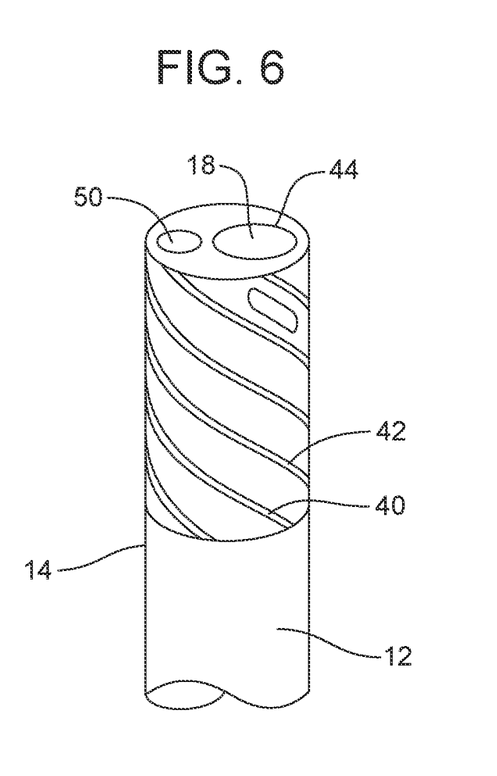
FIG. 6 is a detailed perspective illustration of one possible embodiment of the flexible suction coagulator of FIG. 5 wherein the coagulator comprises two helical electrodes.
Figure 7:
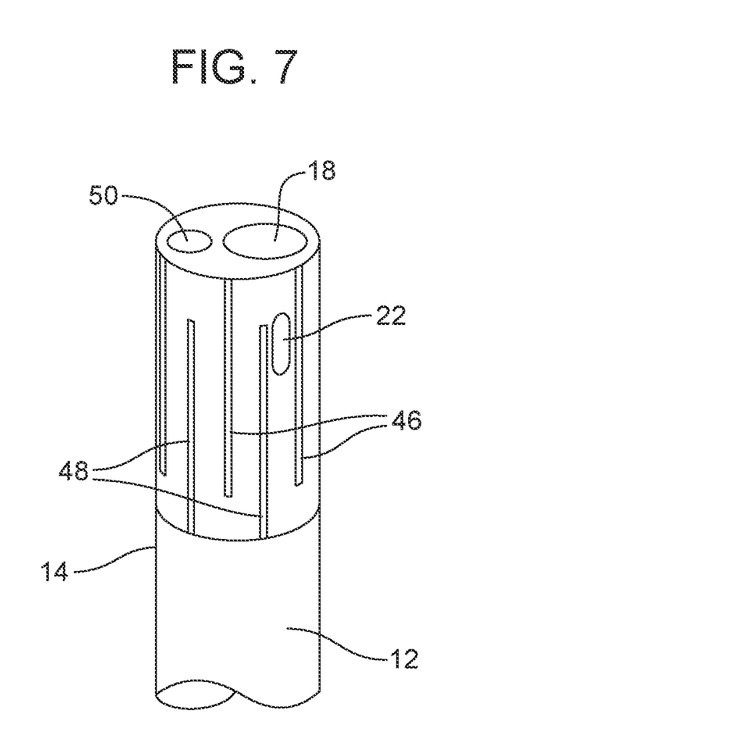
FIG. 7 is a detailed perspective illustration of one possible embodiment of the flexible suction coagulator of FIG. 5 wherein the coagulator comprises two interdigitating electrodes.

FIG. 6 illustrates a flexible suction coagulator 10 of the type illustrated in FIGS. 5 and 6 having a coagulator and tissue cutter 20 comprising two helical electrodes 40, 42. FIG. 7 illustrates a flexible suction coagulator 10 of the type illustrated in FIGS. 5 and 6 having a coagulator and tissue cutter 20 including two interdigitating electrodes 46, 48. The electrodes 40, 42, 46, 48 of any embodiment may be made from a noble metal such as gold and silver using either conventional lithographic printing means or electrochemical deposition methods.

Figure 8:
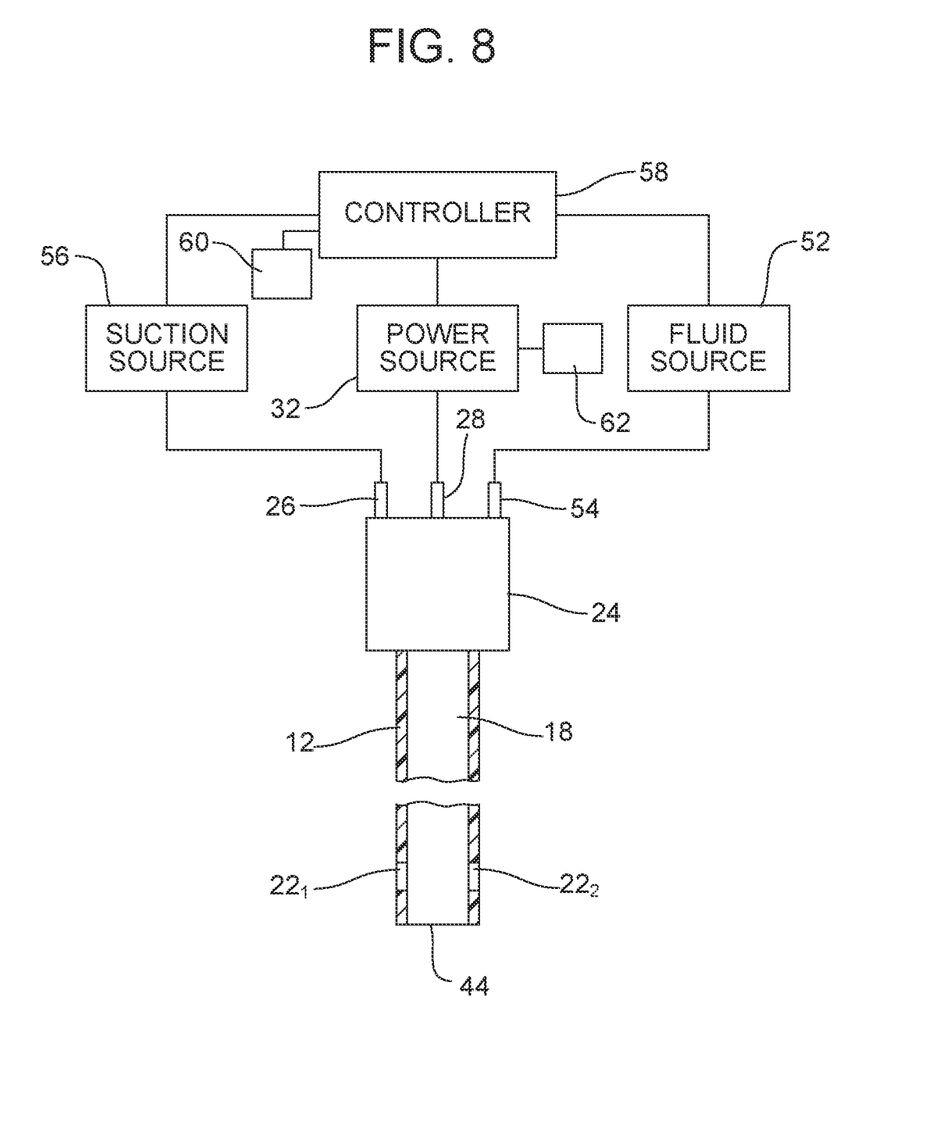
FIG. 8 is a schematic illustration of the control system of the flexible suction coagulator.

As schematically illustrated in FIG. 8, the flexible suction coagulator 10 may include a suction source 56, such as a vacuum pump, connected to the suction channel 18 by the suction connector 26. A controller 58, is connected to the suction source 56. The controller 56 may comprise a dedicated microprocessor or an electronic control unit (ECU) operating in accordance with instructions received from appropriate control software. Such a controller 58 may include one or more processors, one or more memories and one or more human interfaces in communication with each other over one or more communication buses.

The controller 58 may incorporate or be connected to a fluid sensor 60 capable of detecting when saline, blood or other body fluids are around the two electrodes 40, 42 or 46, 48. Thus, the controller 58 provides a smart control feature for the suction source 56.

More specifically, the fluid sensor 60 may use the two leads 30 from the electrodes 40,42 or 46,48 to monitor the impedance between the two electrodes. This is done by applying a small baseline current between the two electrodes and measuring the impedance. Saline, blood and other body fluids have a much smaller impedance value compared with air or direct tissue contact. Thus, when the two electrodes 40,42 or 46,48 are in the presence of saline, blood or other body fluids, there is a drop in impedance corresponding to an increase in conductivity between the electrodes. An event reflected by a significant drop in impedance, i.e. one below a predetermined level, will suggest excessive fluid or bleeding. The controller 58 is adapted to activate the suction source 56 to apply suction at the at least one suction port 22 in response to the body fluid sensor 60 detecting (e.g. by a drop in impedance) fluids adjacent the electrodes 40,42/46, 48 at the distal end 16 of the elongated body 12. Once the impedance again rises to a "normal level" consistent with air or direct tissue contact, the controller 58 is adapted to deactivate the suction source 56.

From the above description, it should be appreciated that the two leads 30 for the two electrodes 40,42 or 46, 48 are used both to (a) activate the electrodes for cautery action and (b) monitor for fluid. The controller 58 may be adapted to periodically alternate operation between fluid sensing and electrode activation in any appropriate manner desired to ensure proper operation.

In the embodiments of the flexible suction coagulator illustrated in FIGS. 5-8, the controller 58 may also be connected to and control operation of the fluid source 52. More particularly, the controller 58 may be adapted to deliver the desired fluid through the fluid delivery channel 50 in pulses. Those pulses may have an amplitude of between about 0.01 ml/min and about 1000 ml/min and a frequency of between about 0.1 Hz and about 10 Hz. Further, the controller 58 may be adapted to initiate the pulses in response to initiation of cautery action, initiation of suction, impedance changes detected by sensor 60 and/or the user's discretion.

Still further, the controller 58 may be connected to and control the power source 32. In at least one possible embodiment, the controller 58 may be adapted to provide coagulation action in a bipolar excitation mode through the first and second electrodes 40,42 or 46, 48. Where the flexible suction coagulator 10 also includes a grounding pad 62 that adheres to the patient in a manner to complete an electrical circuit, the controller 58 may also be adapted to provide coagulation action in a unipolar excitation mode through any one of the electrodes 40, 42 or 46, 48 and the grounding pad 62. The controller 58 may also be adapted to provide tissue cutting action in a unipolar mode through any one of the electrodes 40 or 42/46 or 48 and the grounding pad 62.

More particularly, the controller 58 may be adapted to use a first wave form of an alternating current signal for providing tissue cutting action and a second wave form of an alternating current signal to provide for the coagulation action. In one possible embodiment, the first wave form is a sinusoidal continuous (100% duty cycle) waveform while the second wave form is a sinusoidal intermittent (e.g. about 10%-90% duty cycle) wave form. Such alternating current signals are readily produced by the power source 32 under the control of the controller 58.

In use, the controller 32 is connected to the power source 32, the suction source 56 and the fluid source 52 (if the optional fluid source feature is to be used). The power source 32 is connected to the electrode pair 40, 42 or 46,48 by way of the electrical connector 28 of the connection terminal 24 and the leads 30. The power source 32 is also connected to the grounding pad 62.

Figure 9:
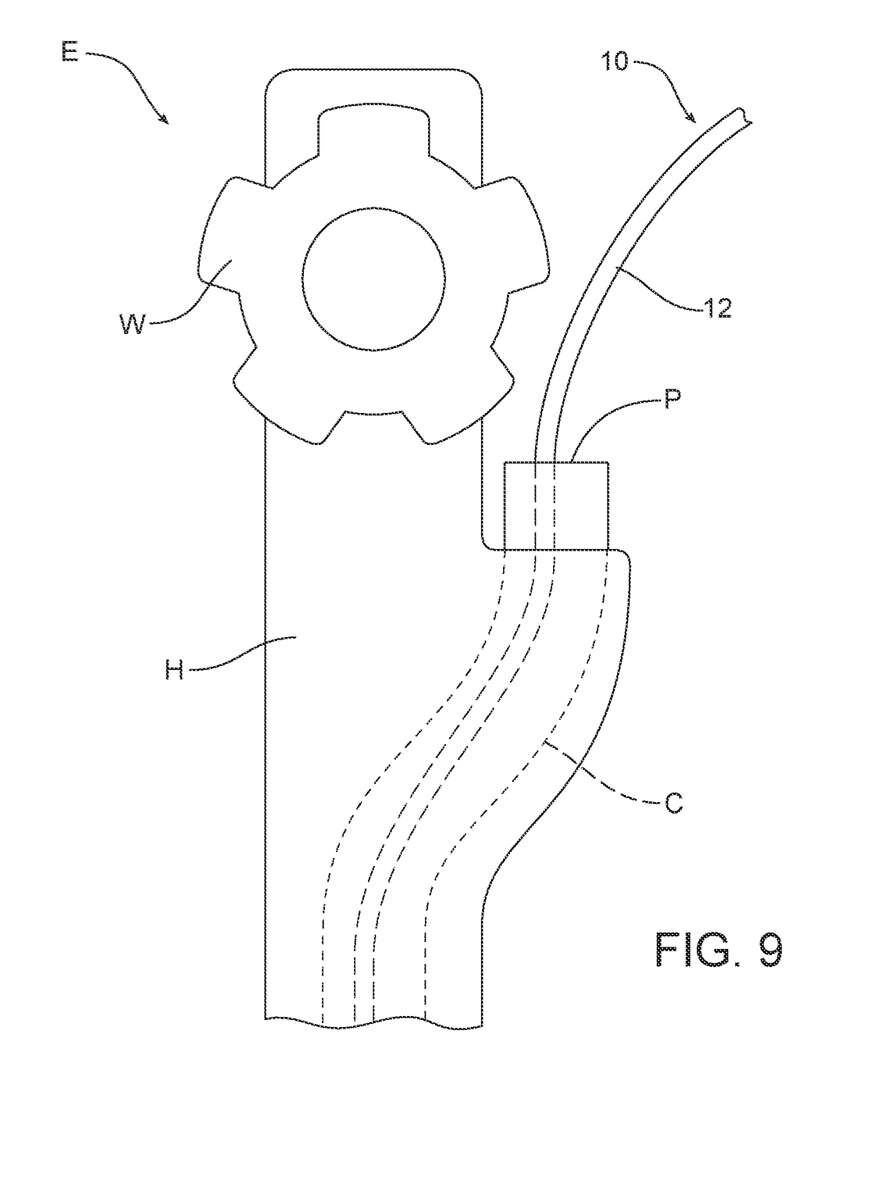
FIG. 9 is a schematic perspective view illustrating the flexible suction coagulator inserted into the working channel port at the handle of an endoscope.
Figure 10:
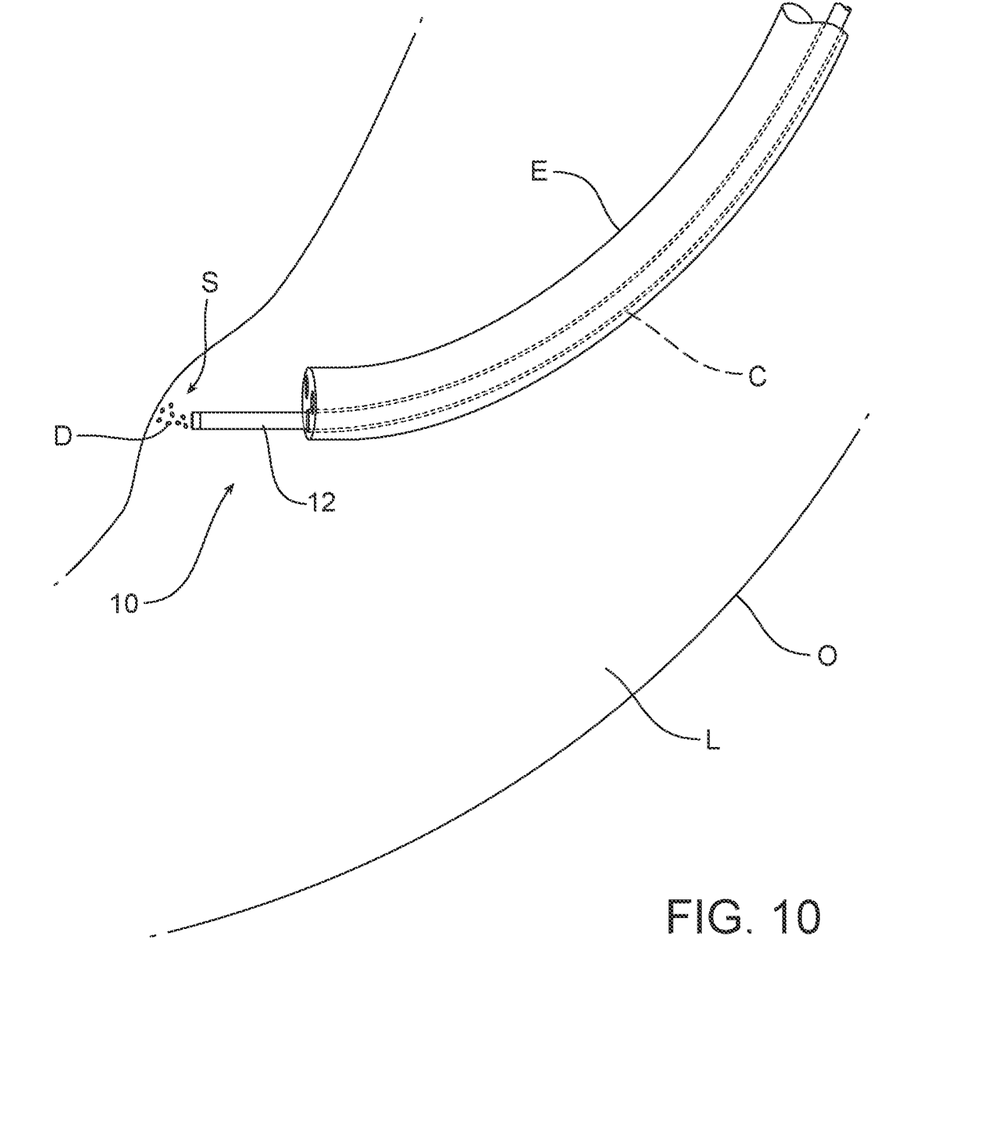
FIG. 10 is a schematic illustration of the flexible suction coagulator passing through the working passageway of an endoscope and being used to provide (a) coagulation to stop bleeding and (b) suction of blood and debris away from an operation site into the suction port of the device.

The distal end 16 of the elongated tubular body 12 is inserted into the working channel port P at the handle H of an endoscope E near the control wheel W as illustrated in FIG. 9. The elongated tubular body 12 is then pushed through the working channel C of the endoscope until the distal end 16, including the electrodes 40, 42 or 46, 48, the suction port 22 and the tip opening 44 extend from the distal end of the endoscope (see FIG. 10).

Figure 11:
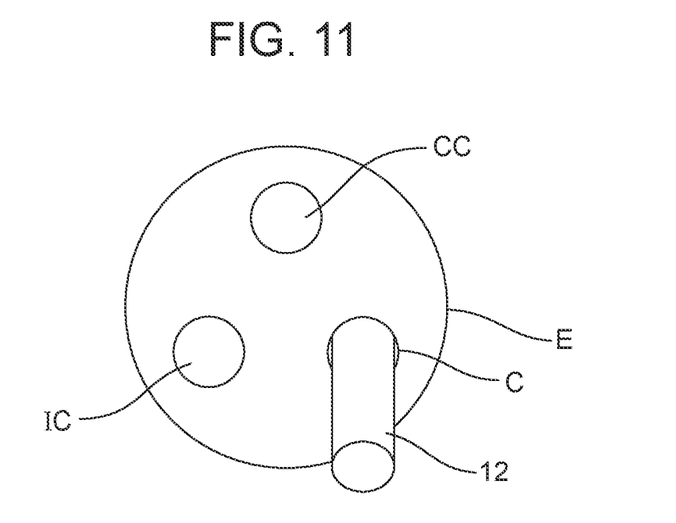
FIG. 11 is an end view illustrating the flexible suction coagulator extending from the distal end of the working channel of a single working channel endoscope.

The endoscope E includes a light source that provides illumination to the treatment site S in the lumen L of an organ O such as the stomach, esophagus, colon or the like as well as a camera for viewing (note dedicated illumination channel IC for lighting and dedicated camera channel CC for viewing in FIG. 11). Upon viewing bleeding at the treatment site S, the endoscope E may be positioned with the handle H and the control wheel W to bring the coagulator 20 into position to stop the bleeding. More particularly, when the coagulator and tissue cutter 20 is in contact with the source of bleeding, activation of the electrode pair 40,42 or 46,48 of the coagulator and tissue cutter 20 stops the bleeding. Any blood and tissue debris D may be drawn from the treatment site S by activation of the suction source 56. Cleansing fluid from the fluid source 52 may also be provided to flush debris D into the suction port 22 and allow clearer viewing to confirm that the bleeding has been arrested. The cleansing fluid also helps prevent clogging of the suction channel 18.

Where the visual field of the treatment site is obscured for some reason, the controller 58 and the fluid sensor 60 function to periodically monitor the impedance between the electrode pairs 40, 42 or 46, 48. Should the impedance drop below a predetermined level, that is an indication of blood and/or debris D at the treatment site. In such a circumstance, the suction source 56 is activated to draw any blood or fluid away from the treatment site S into the suction port 22 until a normal impedance characteristic of air or tissue contact is detected. Here, it should be appreciated that the fluid source 52 may also be automatically or manually activated with the suction source 56 when the impedance drops below the predetermined level in order to flush the treatment site and wash blood, tissue debris and the like toward the suction port 22.

Figure 12:
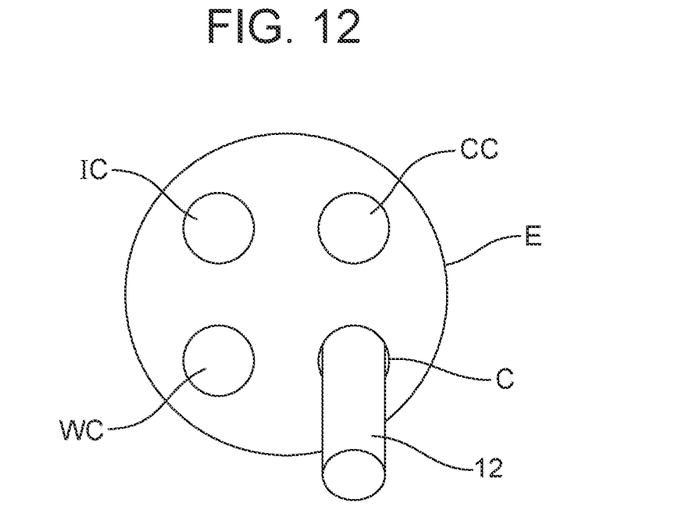
FIG. 12 is an end view illustrating the flexible suction coagulator extending from the distal end of the one working channel of a dual working channel endoscope.

FIG. 12 illustrates the flexible suction coagulator 10 extending from one working channel C of a dual working channel endoscope E including a second working channel WC, an illumination channel IC and a camera channel CC.

The flexible suction coagulator 10 has great versatility of operation. The user of the flexible suction coagulator 10 may perform the coagulation, suction and fluid flushing functions independently or in any combination in order to meet the needs of any particular application or medical procedure. These functions may all be manually controlled, automatically controlled with the artificial intelligence of the controller 58 or some combination of the two.

Each of the following terms written in singular grammatical form: "a", "an", and the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

Terms of approximation, such as the terms about, substantially, approximately, etc., as used herein, refers to ±10% of the stated numerical value. Use of the terms parallel or perpendicular are meant to mean approximately meeting this condition, unless otherwise specified.

It is to be fully understood that certain aspects, characteristics, and features, of the flexible suction coagulator 10, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the flexible suction coagulator 10 which are illustratively described and presented in combination or sub-combination in the context or format of a single embodiment may also be illustratively described and presented in the context or format of a plurality of separate embodiments.

Although the flexible suction coagulator 10 has been illustratively described and presented by way of specific exemplary embodiments, and examples thereof, it is evident that many alternatives, modifications, or/and variations, thereof, will be apparent to those skilled in the art. For example, the above description refers to a fluid source 52 that includes a pump under control of the controller 58. Other fluid sources could be used including, for example, a manually controlled syringe. The flexible suction coagulator 10 may also include a wire stylet that may be run down the length of the suction channel 18 to engage and dislodge any potential clog of tissue and debris. Further, while two ports $22_1$ and $22_2$ are described in the illustrated embodiment, other numbers of ports may be provided. Further, the ports 22 do not have to be opposing.

The above description focuses on the use of the flexible suction coagulator 10 with an endoscope in the gastrointestinal track. It should also be noted that the flexible suction coagulator has a wide range of applications including:
ENT
    Endoscopic ear surgeries
    Sinus surgeries and epistaxis (nosebleed) emergencies for controlling bleeding as passed through scopes or on endoscopic sheaths
    Flexible laryngeal procedures for control of bleeding and cauterization of granulation tissue or masses
GI/Colorectal
    Esophageal control of bleeding
    Stomach
    Colon
    Small bowel
    Bleeding, tumor debulking
    ERCP ampullary bleeding post sphincterotomy
Pulmonary
    Bronchoscopic—controlling bleeding, tumor debulking
Robotic platforms
    Medrobotics System—flexible snake robotic platform which could utilize this technology for bleeding control (currently they don't even offer suctioning)
    Da Vinci robot It is intended that all such alternatives, modifications, or/and variations, fall within the spirit of, and are encompassed by, the broad scope of the appended claims.

What is claimed:

1. A flexible suction coagulator for use with an endoscope, comprising:
an elongated, tubular body adapted for receipt and operation in a working channel of the endoscope, the elongated tubular body having a proximal end, a distal end and a suction channel extending from the proximal end to the distal end;

a coagulator and tissue cutter adjacent the distal end wherein the coagulator and tissue cutter is two interdigitated electrodes;

at least one suction port in a wall of the tubular body adjacent the distal end between the two interdigitated electrodes, the suction port being in communication with the suction channel; and a connection terminal at the proximal end including (a) a suction connector in communication with the suction channel and (b) an electrical connector electrically connected with the coagulator and tissue cutter.

2. The flexible suction coagulator of claim 1, further including a power source connected to the electrical connector.

3. The flexible suction coagulator of claim 2, further including an actuator for activating the power source and activating the coagulator and tissue cutter to coagulate, cut and cauterize tissue of a patient.

4. The flexible suction coagulator of claim 3, wherein the actuator is a foot pedal actuator connected to the power source.

5. The flexible suction coagulator of claim 3, wherein the at least one suction port comprises two opposed suction ports in a sidewall of the elongated tubular body adjacent the distal end.

6. The flexible suction coagulator of claim 5, wherein the elongated tubular body includes a tip opening at the distal end.

7. The flexible suction coagulator of claim 6, wherein each of said opposed suction ports has a cross sectional area of between about 0.05 $mm^2$ and about 15 $mm^2$ and the tip opening has a cross sectional area of between about 0.05 $mm^2$ and 15 $mm^2$.

8. The flexible suction coagulator of claim 7, wherein a ratio of the cross sectional area of the two opposed suction ports to the cross sectional area of the tip opening is between 0.1:1 to 400:1.

9. The flexible suction coagulator of claim 8, further including a fluid sensor.

10. The flexible suction coagulator of claim 9, further including a suction source connected to the suction port and a controller for the suction source that is adapted to activate the suction source to apply suction at the at least one suction port in response to the fluid sensor detecting fluids adjacent the distal end of the flexible, elongated tubular body.

11. The flexible suction coagulator of claim 10, wherein the elongated tubular body further includes a fluid delivery channel.

12. The flexible suction coagulator of claim 11, further including a fluid source connected to the fluid delivery channel through a fluid port at the connection terminal.

13. The flexible suction coagulator of claim 12, wherein the controller is further configured to deliver the fluid through the fluid delivery channel in pulses.

14. The flexible suction coagulator of claim 13, wherein the controller is adapted to initiate said pulses in response to activation of the coagulator and tissue cutter, activation of the suction source and manual activation.

15. The flexible suction coagulator of claim 1, wherein the flexible, elongated tubular body includes a tip opening at the distal end.

16. The flexible suction coagulator of claim 15, wherein the at least one suction port comprises two opposed suction ports in a sidewall of the elongated tubular body adjacent the distal end and each of said opposed suction ports has a cross sectional area of between about 0.05 $mm^2$ and about 15 $mm^2$ and the tip opening has a cross sectional area of between about 0.05 $mm^2$ and 15 $mm^2$.

17. The flexible suction coagulator of claim 1, further including a fluid sensor carried on the flexible elongated tubular body adjacent the distal end.

18. The flexible suction coagulator of claim 17, further including a suction source connected to the suction port and a controller for the suction source that is adapted to activate the suction source to apply suction at the at least one suction port in response to the fluid sensor detecting fluids adjacent the distal end of the flexible, elongated tubular body.

19. The flexible suction coagulator of claim 18, wherein the elongated tubular body further includes a fluid delivery channel.

20. The flexible suction coagulator of claim 19, further including a fluid source connected to the fluid delivery channel through a fluid port at the connection terminal.

21. The flexible suction coagulator of claim 20, wherein the controller is further configured to deliver the fluid through the fluid delivery channel in pulses.

22. The flexible suction coagulator of claim 1, further including a grounding pad upon which a patient is supported.

23. The flexible suction coagulator of claim 22, further including a suction source connected to the suction port and a controller for the suction source that is adapted to activate the suction source to apply suction at the at least one suction port in response to the fluid sensor detecting fluids adjacent the distal end of the flexible, elongated tubular body and wherein the coagulator and tissue cutter comprises a first electrode and a second electrode, and the controller is adapted to provide coagulation action in a bipolar excitation mode through the first and second electrodes or a unipolar excitation mode through one of the first and second electrodes and the grounding pad.

24. The flexible suction coagulator of claim 23, wherein the controller is adapted to use a first wave form of an alternating current signal for providing tissue cutting action and a second wave form of an alternating current signal for providing the coagulation action.

25. The flexible suction coagulator of claim 24, wherein the first wave form is a sinusoidal continuous wave form and the second wave form is a sinusoidal intermittent wave form.

26. The flexible suction coagulator of claim 25, wherein the controller is adapted to provide tissue cutting in a unipolar excitation mode through one of the first and second electrodes and the grounding pad.

* * * * *